(12) United States Patent
Sheikh-Bahaei et al.

(10) Patent No.: US 12,137,389 B2
(45) Date of Patent: Nov. 5, 2024

(54) SYSTEMS AND METHODS FOR COMPUTING DEVICE ASSOCIATION

(71) Applicant: WootCloud Inc., San Jose, CA (US)

(72) Inventors: Shahab Sheikh-Bahaei, Atherton, CA (US); Srinivas Akella, San Jose, CA (US)

(73) Assignee: NETSKOPE, INC., Santa Clara, CA (US)

( * ) Notice: Subject to any disclaimer, the term of this patent is extended or adjusted under 35 U.S.C. 154(b) by 301 days.

(21) Appl. No.: 17/551,966

(22) Filed: Dec. 15, 2021

(65) Prior Publication Data
US 2023/0188937 A1 Jun. 15, 2023

(51) Int. Cl.
*H04W 4/029* (2018.01)
*H04W 4/02* (2018.01)
(Continued)

(52) U.S. Cl.
CPC ........... *H04W 4/029* (2018.02); *H04W 4/021* (2013.01); *H04W 4/023* (2013.01); *H04W 12/64* (2021.01); *H04W 84/18* (2013.01)

(58) Field of Classification Search
CPC ..... H04W 12/06; H04W 12/63; H04W 4/029; H04W 12/12; H04W 12/08; H04W 12/122; H04W 4/027; H04W 4/02; H04W 4/021; H04W 12/79; H04W 4/80; H04W 12/68; H04W 4/025; H04W 64/00; H04W 84/12; H04W 12/121; H04W 88/02; H04W 12/64; H04W 4/026; H04W 12/02; H04W 12/033; H04W 12/10; H04W 4/023; H04W 4/33; H04W 4/40; H04W 48/04; H04W 72/0453; H04W 24/08; H04W 4/38; H04W 8/04; H04W 92/02; H04W 12/086; H04W 12/126; H04W 12/61; H04W 92/22; H04W 12/37; H04W 28/12; H04W 4/00; H04W 4/30; H04L 63/1416; H04L 63/1408; H04L 9/3247; H04L 63/0236; H04L 63/0876;
(Continued)

(56) References Cited

U.S. PATENT DOCUMENTS 8,438,184 B1   5/2013   Wang
8,725,570 B2   5/2014   Doughty
(Continued)

*Primary Examiner* — Kwasi Karikari
(74) *Attorney, Agent, or Firm* — David R. Stevens; Stevens Law Group

(57) ABSTRACT

Systems and methods for computing device association are described. One aspect includes receiving first and second network communication data for a first and second computing device over a communication network, respectively. For each computing device, a first and second data set are extracted from the first and second network communication data, respectively. The first data set includes first spatial data and first temporal data associated with the first computing device. The second data set includes second spatial data and second temporal data associated with the second computing device. The first and second data sets are correlated. A first geometric distance between the first temporal data and the second temporal data and a second geometric distance between the first spatial data and the second spatial data are computed. The method identifies that the first computing device and the second computing device belong to a common user.

20 Claims, 10 Drawing Sheets

(51) Int. Cl.
 *H04W 4/021* (2018.01)
 *H04W 12/64* (2021.01)
 *H04W 84/18* (2009.01)

(58) Field of Classification Search
 CPC . H04L 63/1466; H04L 63/105; H04L 67/535; H04L 67/306; H04L 9/088
 See application file for complete search history.

(56) References Cited

U.S. PATENT DOCUMENTS

| | | | |
|---|---|---|---|
| 9,009,258 B2 | 4/2015 | Ramachandran | |
| 9,241,263 B2 | 1/2016 | Courtay | |
| 9,514,248 B1 | 12/2016 | Guan | |
| 9,881,301 B2 | 1/2018 | Rajkumar | |
| 9,955,359 B2 | 4/2018 | Monaghan | |
| 10,129,271 B2 | 11/2018 | Mrkos | |
| 2006/0291412 A1 | 12/2006 | Naqvi | |
| 2013/0124309 A1 | 5/2013 | Traasdahl | |
| 2013/0124331 A1 | 5/2013 | Doughty | |
| 2014/0095320 A1 | 4/2014 | Sivaramakrishnan | |
| 2014/0136333 A1 | 5/2014 | Shoshitaishvili | |
| 2015/0248706 A1 | 9/2015 | Mi | |
| 2015/0341453 A1 | 11/2015 | Miller | |
| 2015/0363823 A1 | 12/2015 | Placentra, II | |
| 2016/0162937 A1 | 6/2016 | Chawla | |
| 2016/0165651 A1 | 6/2016 | Pathuri | |
| 2016/0182657 A1 | 6/2016 | Mukherjee | |
| 2016/0224901 A1* | 8/2016 | Scarr | G06N 5/048 |
| 2016/0323239 A1 | 11/2016 | Cheng | |
| 2017/0024484 A1* | 1/2017 | Qiu | H04L 67/535 |
| 2017/0111226 A1 | 4/2017 | Zhou | |
| 2017/0161761 A1 | 6/2017 | Koh | |
| 2017/0352256 A1* | 12/2017 | Miwa | G06K 19/10 |
| 2018/0019924 A1 | 1/2018 | Beuschel | |
| 2018/0351835 A1 | 12/2018 | Williams | |

* cited by examiner

| DEVICE \ DAY | 1 | 2 | 3 | 4 | 5 | 6 | 7 | 8 | 9 | 10 | 11 | 12 | 13 | 14 | 15 | 16 | 17 | 18 | 19 |
|---|---|---|---|---|---|---|---|---|---|---|---|---|---|---|---|---|---|---|---|
| COMPUTER A | X | X |   | X |   | X |   | X |   |   |   |   |   | X |   | X | X | X | X |
| PHONE B | X | X | X | X |   | X |   | X |   | X |   |   |   |   |   | X | X | X | X |
| PHONE C | X | X | X | X | X | X | X |   | X | X |   |   |   |   | X | X | X | X |   |
| COMPUTER D | X | X | X | X | X | X | X |   | X | X | X | X | X |   | X | X | X | X | X |
| WATCH E | X | X | X | X | X | X | X |   | X | X |   | X | X |   | X | X | X | X | X |

| DEVICE \ STATION | 1 | 2 | 3 | 4 | 5 | 6 | 7 | 8 | 9 | 10 |
|---|---|---|---|---|---|---|---|---|---|---|
| COMPUTER A | | | X | X | | | | X | | |
| PHONE B | X | X | X | X | | | X | X | X | X |
| PHONE C | X | X | X | X | | X | X | | | X |
| COMPUTER D | | | | | X | | | | | |
| WATCH E | X | X | | X | | X | X | | X | X |

800, 802, 804
LOCATION PROXIMITY

FIG. 10

| DEVICE \ PROPERTIES | HOSTNAME | USERNAME |
|---|---|---|
| COMPUTER A | JohnsMBA | John.smith |
| PHONE B | JohnsiPhone | John.smith |
| PHONE C | Jills iPhone 6s | Jill.smith |
| COMPUTER D | Desktop1234 | Jill.smith |
| WATCH E | Jillswatch | Jill.smith |

PROPERTIES SIMILARITY 1000, 1002, 1004

SYSTEMS AND METHODS FOR COMPUTING DEVICE ASSOCIATION

BACKGROUND

Technical Field

The present disclosure relates to systems and methods that analyze network communication data from two or more computing devices communicating over a computer network, and associate one or more of these computing devices to a single user.

Background Art

The computing environment in today's world includes households, offices, and individuals being associated with multiple computing devices. For example, a user at an office may simultaneously be associated with and in the proximity of a desktop computer, a mobile phone, and a smartwatch. This association may change from time to time. For example, the user may leave their desktop to attend a meeting at a separate location. In this case, the desktop computer is not in the user's proximity. Or, the user may forget their smartwatch at home on a particular day. In this case, the smartwatch will not be detected on the computer network. In another example, the user may change their mobile phone and come in to the office with a new phone that has not been detected before.

SUMMARY

Aspects of the invention are directed towards systems, methods, and computer program products for associating multiple computing devices on a computer network or communication network to a single (i.e., common) user.

In one aspect, first network communication data for a first computing device may be received over a communication network. Second network communication data for a second computing device may be received over the communication network. A first data set may be extracted from the first network communication data. In one aspect, the first data set includes first spatial data and first temporal data associated with the first computing device. A second data set may be extracted from the second network communication data. In one aspect, the second data set includes second spatial data and second temporal data associated with the second computing device.

The first data set and the second data set may be correlated. In one aspect, the correlating includes computing a first geometric distance between the first temporal data and the second temporal data, and computing a second geometric distance between the first spatial data and the second spatial data. The first computing device and the second computing device may be identified as belonging to a common user. This identification may be responsive to the first geometric distance being less than a first threshold value, and the second geometric distance being less than a second threshold value.

An apparatus to associate multiple computing devices on a computer network to a single user may include a database configured to store first network communication data for a first computing device and second network communication data for a second computing device. In one aspect, the first network communication data and the second network communication data is received over a communication network.

The apparatus may include a processing system configured to extract a first data set from the first network communication data. The first data set may include first spatial data and first temporal data associated with the first computing device The processing system may be configured to extract a second data set from the second network communication data. The second data set may include second spatial data and second temporal data associated with the second computing device.

The apparatus may include a correlator configured to correlate the first data set and the second data set. In one aspect, the correlation includes computing a first geometric distance between the first temporal data and the second temporal data, and computing a second geometric distance between the first spatial data and the second spatial data. The correlator may identify that the first computing device and the second computing device belong to a common user. In one aspect, identifying may be responsive to the first geometric distance being less than a first threshold value, and the second geometric distance being less than a second threshold value.

BRIEF DESCRIPTION OF THE DRAWINGS

Non-limiting and non-exhaustive embodiments of the present disclosure are described with reference to the following figures, wherein like reference numerals refer to like parts throughout the various figures unless otherwise specified.

FIG. 7 is a schematic depicting a device versus time proximity matrix.

FIG. 8 is a schematic depicting a device versus location proximity matrix.

FIG. 10 is a schematic depicting a device versus properties similarity matrix.

DETAILED DESCRIPTION

Figure 1:
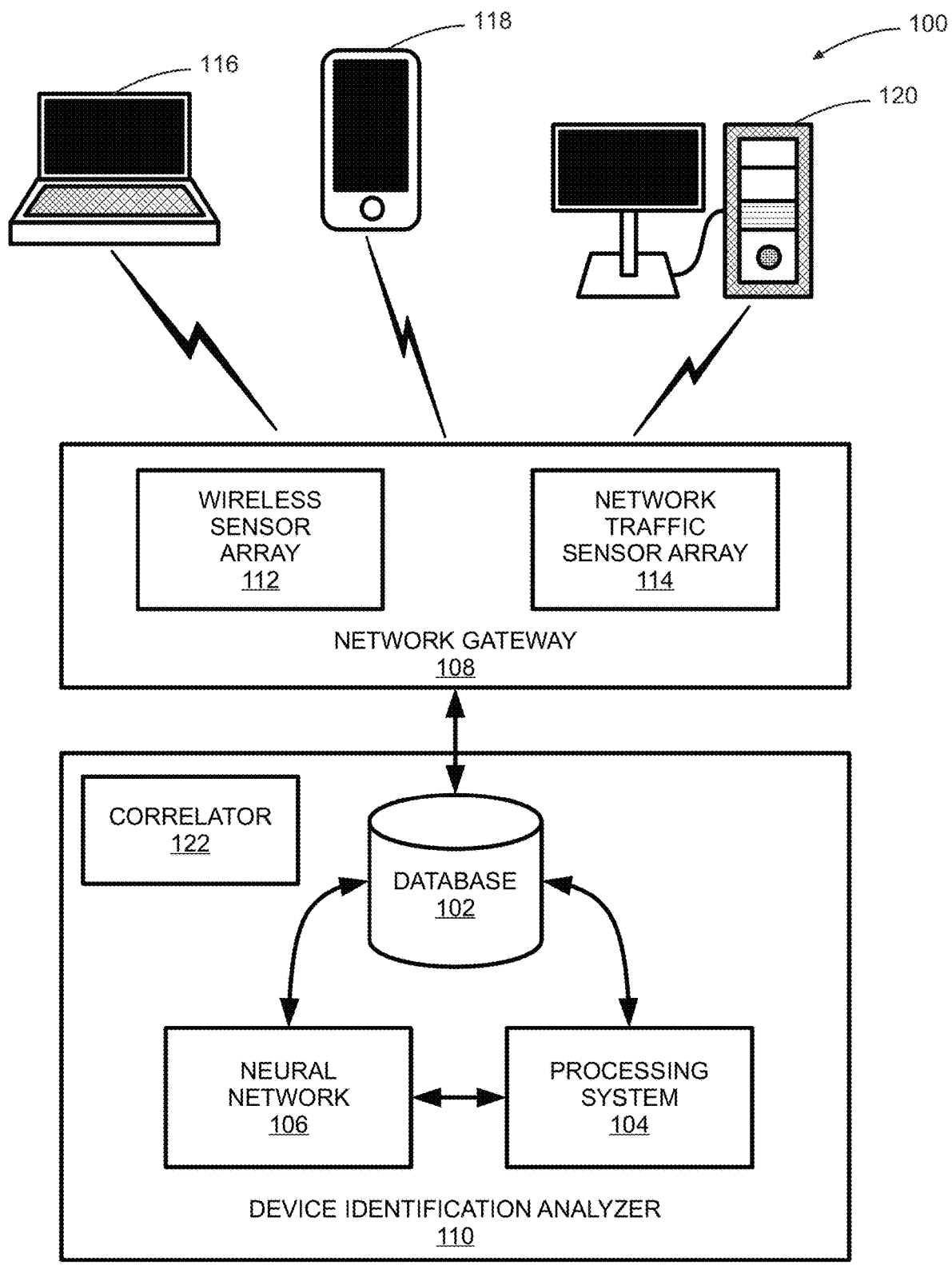
FIG. 1 is a block diagram depicting an embodiment of a computing device classification system.

In the following description, reference is made to the accompanying drawings that form a part thereof, and in which is shown by way of illustration specific exemplary embodiments in which the disclosure may be practiced. These embodiments are described in sufficient detail to enable those skilled in the art to practice the concepts disclosed herein, and it is to be understood that modifications to the various disclosed embodiments may be made, and other embodiments may be utilized, without departing from the scope of the present disclosure. The following detailed description is, therefore, not to be taken in a limiting sense.

Reference throughout this specification to "one embodiment," "an embodiment," "one example," or "an example" means that a particular feature, structure, or characteristic described in connection with the embodiment or example is included in at least one embodiment of the present disclosure. Thus, appearances of the phrases "in one embodiment," "in an embodiment," "one example," or "an example" in various places throughout this specification are not necessarily all referring to the same embodiment or example. Furthermore, the particular features, structures, databases, or characteristics may be combined in any suitable combinations and/or sub-combinations in one or more embodiments or examples. In addition, it should be appreciated that the figures provided herewith are for explanation purposes to persons ordinarily skilled in the art and that the drawings are not necessarily drawn to scale.

Embodiments in accordance with the present disclosure may be embodied as an apparatus, method, or computer program product. Accordingly, the present disclosure may take the form of an entirely hardware-comprised embodiment, an entirely software-comprised embodiment (including firmware, resident software, micro-code, etc.), or an embodiment combining software and hardware aspects that may all generally be referred to herein as a "circuit," "module," or "system." Furthermore, embodiments of the present disclosure may take the form of a computer program product embodied in any tangible medium of expression having computer-usable program code embodied in the medium.

Any combination of one or more computer-usable or computer-readable media may be utilized. For example, a computer-readable medium may include one or more of a portable computer diskette, a hard disk, a random access memory (RAM) device, a read-only memory (ROM) device, an erasable programmable read-only memory (EPROM or Flash memory) device, a portable compact disc read-only memory (CDROM), an optical storage device, a magnetic storage device, and any other storage medium now known or hereafter discovered. Computer program code for carrying out operations of the present disclosure may be written in any combination of one or more programming languages. Such code may be compiled from source code to computer-readable assembly language or machine code suitable for the device or computer on which the code will be executed.

Embodiments may also be implemented in cloud computing environments. In this description and the following claims, "cloud computing" may be defined as a model for enabling ubiquitous, convenient, on-demand network access to a shared pool of configurable computing resources (e.g., networks, servers, storage, applications, and services) that can be rapidly provisioned via virtualization and released with minimal management effort or service provider interaction and then scaled accordingly. A cloud model can be composed of various characteristics (e.g., on-demand self-service, broad network access, resource pooling, rapid elasticity, and measured service), service models (e.g., Software as a Service ("SaaS"), Platform as a Service ("PaaS"), and Infrastructure as a Service ("IaaS")), and deployment models (e.g., private cloud, community cloud, public cloud, and hybrid cloud).

The flow diagrams and block diagrams in the attached figures illustrate the architecture, functionality, and operation of possible implementations of systems, methods, and computer program products according to various embodiments of the present disclosure. In this regard, each block in the flow diagrams or block diagrams may represent a module, segment, or portion of code, which includes one or more executable instructions for implementing the specified logical function(s). It will also be noted that each block of the block diagrams and/or flow diagrams, and combinations of blocks in the block diagrams and/or flow diagrams, may be implemented by special purpose hardware-based systems that perform the specified functions or acts, or combinations of special purpose hardware and computer instructions. These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flow diagram and/or block diagram block or blocks.

A computing device user may be associated with multiple computing devices in, for example, a workplace environment. Such a user may use a smartphone, a smartwatch and a desktop computer, all of which may be connected to the workplace network (e.g., an intranet). Establishing an association of a particular computing device to a specific user may facilitate monitoring user behavior. This, in turn, can provide useful information about the user such as workplace productivity, user location, user behavior, network usage history, possible misuse of network resources, and so on. Establishing an association of one or more computing devices to a specific user is, therefore, an important function from a network management perspective.

FIG. 1 is a block diagram depicting an embodiment of a computing device classification system 100. As depicted, computing device classification system 100 includes a network gateway 108, a device identification analyzer 110, and one or more computing devices such as a computing device 116, a computing device 118, and a computing device 120. Network gateway 108 further includes a wireless sensor array 112 and a network traffic sensor array 114. Device identification analyzer 110 further includes a database 102, a neural network 106, a processing system 104, and a correlator 122.

In one aspect, computing device 116, computing device 118, and computing device 120 are communicatively coupled to network gateway 108. Computing device 116 through computing device 120 (and other computing devices that may be communicatively coupled to network gateway 108 but not shown in FIG. 1) may be any combination of desktop computers, laptop computers, mobile devices such as tablets and cellular phones, internet-of-things (IoT) devices, or any other computing devices. Computing devices 116 through 120 may be associated with a computer network or a communication network such as an intranet in an office environment.

In one aspect, network gateway 108 is communicatively coupled with device identification analyzer 110. Specifically, network gateway 108 is communicatively coupled with database 102. Each of database 102, processing system 104, and neural network 106 are communicatively coupled with each other, as shown in FIG. 1. In some embodiments, neural network 106 is a convolutional neural network. In other embodiments, neural network 106 is a recurrent neural network, a temporal convolutional network, or a similar learning algorithm. Correlator 122 may be a standalone component of device identification analyzer 110, or correlator 122 may be included in neural network 106 and/or processing system 104.

In some embodiments, computing device 116 through computing device 120 are a part of a computer/communication network and communicate over the network using any combination of wired or wireless communication protocols. For example, a wired communication protocol such as Ethernet may be used by any of computing device 116 through computing device 120. Examples of wireless communication protocols include Wi-Fi, Bluetooth, Bluetooth Low Energy (BLE), Zigbee, Long-Term Evolution (LTE), Lorawan, zwave, ultrasound communication, and so on. Network gateway 108 receives network communication data from each of computing device 116 through computing device 120, using wireless sensor array 112 and network traffic sensor array 114. In some embodiments, wireless sensor array 112 is configured to receive any combination of wireless communication signals that include the wireless communication signals described above; network traffic sensor array 114 is configured to receive network communication signals such as Ethernet data.

In one aspect, communication data associated with computing device 116 through computing device 120 is collectively received by network gateway 108 and transmitted to database 102. Database 102 is configured to store communication data (i.e., network communication data) associated with computing device 116 through computing device 120.

In some embodiments, processing system 104 accesses communication data associated with a computing device (e.g., computing device 116) from database 102, and processes the communication data to generate a first data set containing first temporal data and first spatial data associated with computing device 116.

Temporal data associated with a computing device is defined as historical communication data over a past period of time (e.g., ten minutes, one hour, five hours, two weeks, six months, or some other past time interval), and also communication data for a present time interval. The temporal data may include data from a past timeframe and a present timeframe. Spatial data associated with a computing device is defined as data that enables locating the computing device at a specific physical location covered by the computer network (e.g., workstation/desk, conference room, kitchen/pantry, etc.). This location data can be obtained, for example, by probing Wi-Fi access points as the computing device moves from one Wi-Fi access point to another while physically moving through the office environment or establishment. Or, triangulation/trilateration techniques based on received signal strength (RSS) may be used to geolocate a computing device within a facility.

In one aspect, processing system 104 accesses communication data associated with a computing device other than computing device 116 (e.g., computing device 118) from database 102, and processes the communication data to generate a second data set containing second temporal data and second spatial data associated with computing device 118.

In an aspect, correlator 122 computes a first geometric distance between the first temporal data and the second temporal data, and a second geometric distance between the first spatial data and the second spatial data. Responsive to computing the first geometric distance and the second geometric distance, correlator 122 may determine that computing device 116 and computing device 118 are associated with a common user. In one aspect, this determination is based on the first geometric distance and the second geometric distance being less than a first threshold value and a second threshold value (e.g., a temporal threshold value and a spatial threshold value), respectively.

In one aspect, the first threshold value and the second threshold value are a first normalized threshold value and a second normalized threshold value, respectively. For example, the first normalized threshold value may be approximately 1, while the second normalized threshold value may be approximately 0.5.

In one aspect, each of the first and the second geometric distance is computed as a norm of a difference between two vectors. Each of the two vectors may characterize spatial and temporal properties of the associated computing device. In another aspect, correlator 122 may perform a correlation operation between two vectors to determine an extent to which the two vectors match each other.

In some embodiments, all data associated with associating one or more computing devices with a user is stored in database 102.

Other data in each of the first and the second data set may include the following information about the corresponding computing device:
A type of the computing device,
An operating system associated with the computing device,
A control associated with the computing device,
A functionality of the computing device, and
An ownership of the computing device.
Radio interface information for each interface supported by the computing device.
Operating system, type and classification of the computing device.
Functionality of computing device and the services/apps supported by the computing device.
Micro location and mobility of the computing device (may be used as a basis for the spatial data).
Ownership and control of the computing device (e.g., username or hostname).
Protocol and data characteristics of the computing device.

These other properties may be collectively processed by any combination of processing system 104 and neural network 106. A device identification associated with this processing may be referred to as a "hyper context" or device fingerprint associated with the respective computing device.

Figure 2:
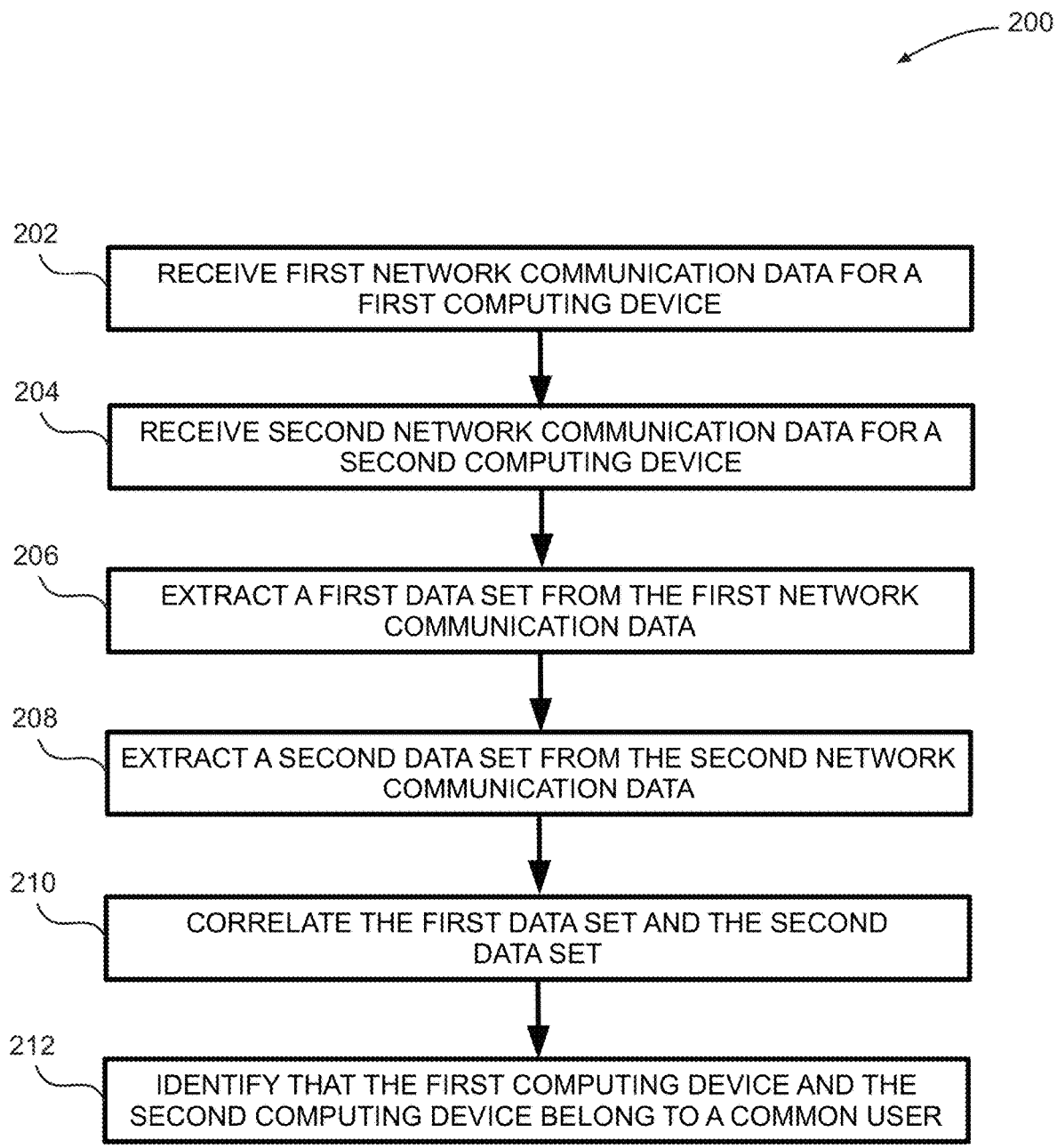
FIG. 2 is a flow diagram depicting an embodiment of a method to associate one or more computing devices to a common user.

FIG. 2 is a flow diagram depicting an embodiment of a method 200 to associate a pair of computing devices with a common user. Method 200 may be implemented, for example, by computing device classification system 100.

Method 200 may include receiving first network communication data from a first computing device (202). For example, any combination of neural network 106 and processing system 104 can receive network communication data associated with computing device 116 from database 102. The first network communication data may be received by database 102 from computing device 116 via network gateway 108, as computing device 116 communicates over the associated computer network or communication network.

Method 200 may include receiving second network communication data from a second computing device (204). For example, any combination of neural network 106 and processing system 104 can receive network communication data associated with computing device 118 from database 102. The second network communication data may be received by database 102 from computing device 118 via network gateway 108, as computing device 118 communicates over the associated computer network or communication network.

Method 200 may include extracting a first data set from the first network communication data (206). For example, any combination of neural network 106 and processing system 104 can extract the first data set from the first network communication data. In one aspect, the first data set includes first spatial data and first temporal data associated with the first computing device.

Method 200 may include extracting a second data set from the second network communication data (208). For example, any combination of neural network 106 and processing system 104 can extract the second data set from the second network communication data. In one aspect, the second data set includes second spatial data and second temporal data associated with the second computing device.

Method 200 may include correlating the first data set and the second data set (210). In one aspect, correlator 122 may correlate the first data set and the second data set. Specifically, correlator 122 may individually correlate the first spatial data and the second spatial data, and the first temporal data and the second temporal data. In one aspect, the correlating includes rendering the first data set as a first spatial vector and a first temporal vector, and rendering the second data set as a second spatial vector and a second temporal vector. Then, a first geometric distance (e.g., a norm of a difference) is computed between the first spatial vector and the second spatial vector. A second geometric distance is computed between the first temporal vector and the second temporal vector.

Alternatively, a first correlation function can be computed for the first spatial vector and the second spatial vector, and a second correlation function can be computed for the first temporal vector and the second temporal vector. The first and second correlation functions are each a measure of a degree of matching between the respective vector pairs.

Method 200 may include identifying that the first computing device and the second computing device belong to a common user (212). For example, if the first geometric distance is less than a first threshold value and the second geometric distance is less than a second threshold value (e.g., a temporal threshold value and a spatial threshold value), then correlator 122 may determine that computing devices 116 and 118 belong to a common user. Alternatively, if the first and second correlation functions are greater than a first and second correlation threshold respectively, then correlator 122 may determine that computing devices 116 and 118 belong to a common user.

Figure 3:
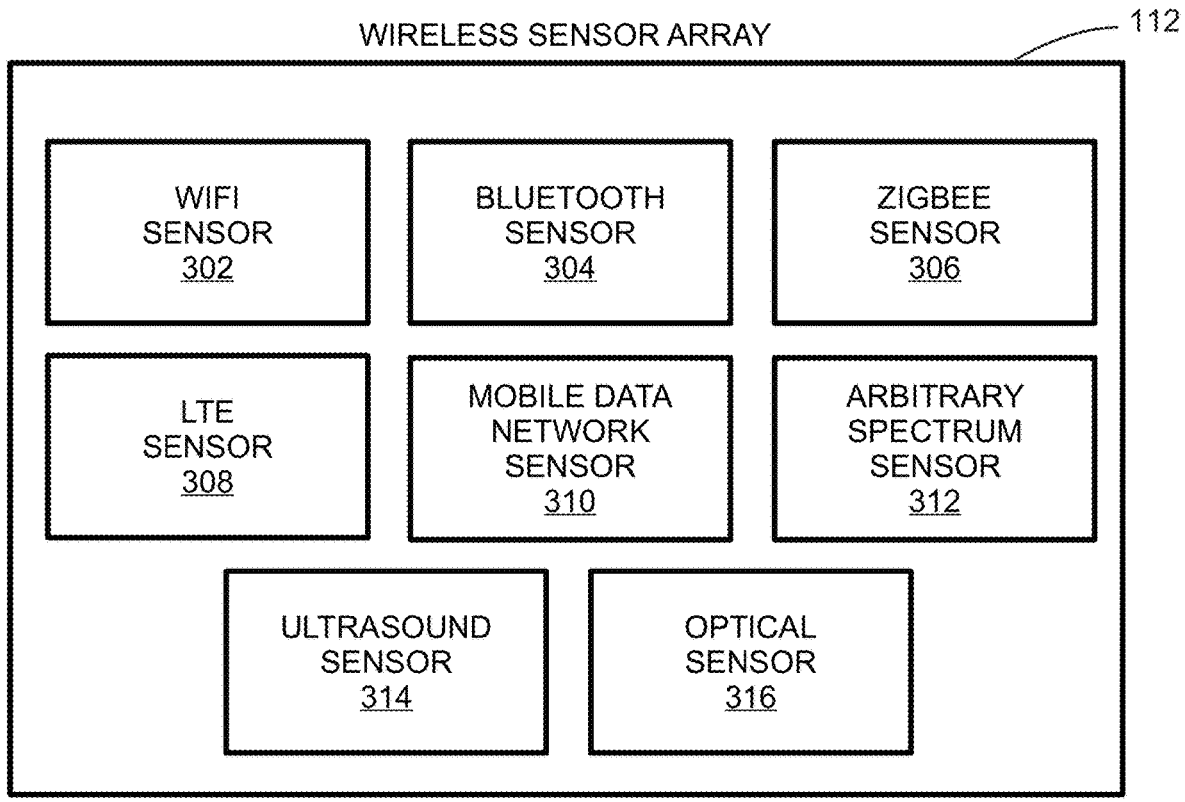
FIG. 3 is a block diagram depicting an embodiment of a wireless sensor array.

FIG. 3 is a block diagram depicting an embodiment of a wireless sensor array 112. Wireless sensor array 112 is configured to scan a physical area in a vicinity of a computer network associated with computing device 116 through computing device 120 to determine any existing RF signals in an RF spectrum associated with the area and non-RF wireless signals associated with the area, and detect and receive any data communication packets associated with the RF signals and the non-RF wireless signals. Essentially, wireless sensor array 112 scans the RF spectrum to determine any existing RF communication signals being used by computing device 116 through computing device 120. Some embodiments of wireless sensor array 112 are able to detect non-RF wireless communication signals used by computing device 116 through computing device 120.

In some embodiments, wireless sensor array 112 includes a Wi-Fi sensor 302 that detects and receives any Wi-Fi communication packets being used for communication by computing device 116 through computing device 120 over the associated communication network. In some embodiments, Wi-Fi sensor 302 is a Wi-Fi packet sniffer. Some embodiments of wireless sensor array 112 include a Bluetooth sensor 304 that detects and receives any Bluetooth communication packets being used for communication by computing device 116 through computing device 120 via one or more peer-to-peer Bluetooth communication links. In some embodiments, Bluetooth sensor 304 is a Bluetooth packet sniffer.

In some embodiments, wireless sensor array 112 includes a ZigBee sensor 306 that detects and receives any ZigBee communication packets being used for communication by computing device 116 through computing device 120 via a ZigBee communication link. In some embodiments, ZigBee sensor 306 is a ZigBee packet sniffer. Some embodiments of wireless sensor array 112 include an LTE sensor 308 that detects long term evolution (LTE) signals being used for communication by computing device 116 through computing device 120. A mobile data network sensor 310 included in some embodiments of wireless sensor array 112 detects communication by computing device 116 through computing device 120 via any other mobile data communication technique such as General Packet Radio Service (GPRS), 3G, 3G+4G, 4G+5G, Global System for Mobile Communications (GSM), Universal Mobile Telecommunications Service (UMTS), and so on. In some embodiments, wireless sensor array 112 includes an arbitrary spectrum sensor 312 that detects and receives RF communication data associated with any arbitrary RF communication protocol used by computing device 116 through computing device 120.

In addition including to sensors that detect RF communication signals, wireless sensor array 112 includes components that are capable of detecting non-RF wireless signals such as ultrasound communication signals and optical communication signals. Specifically, an ultrasound sensor 314 included in some embodiments of wireless sensor array 112 is configured to detect communication data associated with any ultrasonic (ultrasound) communication links used by computing device 116 through computing device 120. In some embodiments, wireless sensor array 112 includes an optical sensor 316 that is configured to detect communication data associated with any wireless optical data links used by computing device 116 through computing device 120.

Figure 4:
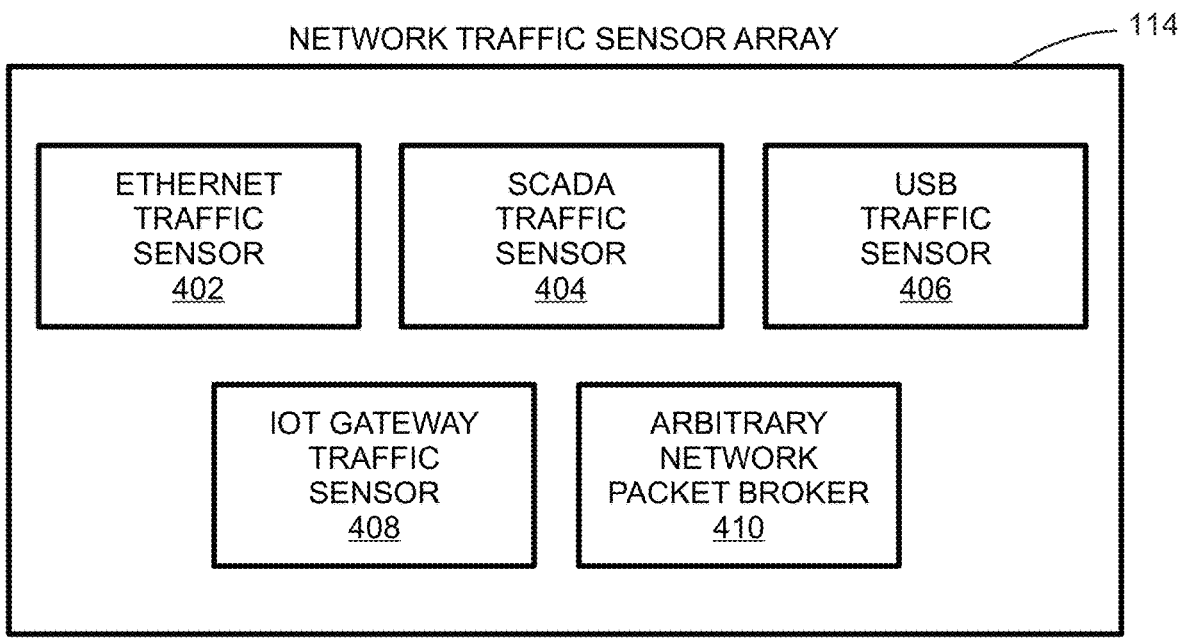
FIG. 4 is a block diagram depicting an embodiment of a network traffic sensor array.

FIG. 4 is a block diagram depicting an embodiment of a network traffic sensor array 114 that is configured to detect any network traffic-related communication data associated with computing device 116 through computing device 120. In some embodiments, network traffic sensor array 114 includes an Ethernet traffic sensor 402 that detects, receives and processes Ethernet traffic communication data associated with computing device 116 through computing device 120. A SCADA traffic sensor 404 included in some embodiments of network traffic sensor array 114 detects, receives and processes SCADA communication data associated with computing device 116 through computing device 120. Some embodiments of network traffic sensor array 114 include a USB traffic sensor 406 that detects, receives and processes USB communication data associated with computing device 116 through computing device 120.

In some embodiments, network traffic sensor array 114 includes an IoT gateway traffic sensor 408. IoT gateway traffic sensor 408 detects, receives, and processes communication data associated with Internet-of-Things (IoT) devices. Some embodiments of network traffic sensor array 114 include an arbitrary network packet broker 410 that detects, receives and processes arbitrary network packets received by network traffic sensor array 114.

In some embodiments, computing device classification system 100 collects data for each computing device associated with computing device classification system 100 (e.g., computing device 116 through computing device 120). This data can be collected by sensors that are both in-band and out of band, and is used to generate a device fingerprint for each computing device. In some embodiments, this process may involve the following steps:

1. Using radio sensors for each spectrum and protocol type (e.g., Bluetooth, Bluetooth Low Energy, Wi-Fi, LTE, ZigBee, and so on), collect time domain and frequency domain information to generate a radio signature and profile for each computing device. RF data points from radio frequency signals include one or more of frequency and bandwidth, spectral signature, duty, pulse signature, frequency offset, timing signature, and sweep analyzer data.
2. Using radio sensors and protocol decoders for each spectrum and protocol type physical layer, layer 1 and layer 2 information for each computing device is obtained, and this information is used to generate an interface signature profile for the computing device. Other information that can be extracted for each computing device includes interface identifiers such as media access control (MAC), international mobile subscriber identity (IMSI), electronic serial number (ESN), and so on, signal strength information, information elements and other layer 1 and 2 details in the data that are specific to an associated communication protocol.
3. For each spectrum protocol, where available, when the corresponding computing device is transmitting or receiving data communication packets, all communication or network traffic data is collected. This traffic data is not limited to just Ethernet traffic but any spectrum data that can be collected is collected to be analyzed.

The information collected above from RF, interface-level, protocol-level and data traffic is learned by supervised and unsupervised machine learning algorithms and rule sets (that may be implemented in neural network 106) to reveal patterns embedded in these measurements (i.e., in the collected information). These machine learning algorithms and rule sets generate models and signatures for each device to get the following intermediate information for each computing device:

1. An operating system information, a type of the computing device and a classification of the computing device. Ex: type: Apple tablet, classification: low power computing, OS: iOS 10.
2. A functionality of the computing device, and services and applications running on the computing device. Ex: Function: Audio/video conferencing, Apps: Zoom, teem.
3. A micro location of the device. This gives insight into mobility of the computing device in a campus, its current location, most frequently-used paths of movement, and whether the computing device travels outside the campus.
4. Ownership and control of the computing device. Whether the computing device is owned by corporate, employee, visitor, or transient, or whether the computing device controlled by a user or the computing device is automated (e.g., a smart phone versus a smart TV).
5. Behavior and rules-based analysis of all data transmissions across all protocols and spectra to and from the computing device.

All the collected data and the intermediate insights (i.e., intermediate information) are then used to develop a device identity fingerprint, a device group fingerprint and device operational fingerprint using temporal convolutional neural network-based algorithms and rule sets for each computing device. These fingerprints enable an accurate recognition of the computing device on the computer network, and enable a classification of normal operation and functions for each computing device. The generated fingerprints are maintained as follows:

1. Each of the above fingerprints are stored in a database such as database 102.
2. The fingerprints are used then to develop device operational profiles for each computing device.
3. The fingerprints are used to identify new computing devices that appear on the network to see if they fall into any established classification category.
4. Identify anomalous behavior in the computing devices whose fingerprints have been collected.
5. Offer insights about any risks, threats associated, and best practices to counter the risks and threats.
6. Generate labels based on all collected information, intermediate insights and final fingerprints, and expose these labels to an application layer.
7. These labels can then be used for policies by users to control access to and from the computing devices.

The operational features described above can also be used in the other systems and methods described herein.

In some embodiments, developing a device fingerprint for a computing device includes collection of data such as RF data, demodulation data, frame data, and other kinds of temporal communication data (i.e., temporal data) associated with the computing device. Other computing device communication parameters that are collected or extracted from raw temporal communication data include RF signal strength, spectrum analysis, MAC address, one or more frames, transmission rate, medium access frame size, inter packet arrival, and so on. The device fingerprint development technique also analyzes the application layer to extract one or more functionalities associated with a computing device, location mobility, one or more logical parameters, ownership and control. All these parameters are combined to generate a device fingerprint associated with a computing device.

A device fingerprint uniquely identifies a computing device across time and space, and is independent of a MAC address or an IP address associated with the computing device. In some embodiments, machine learning algorithms are used to generate this identification, then a MAC address associated with the computing device is reverse-predicted, as described herein. If this reverse-prediction matches a MAC address extracted from network traffic associated with the computing device as described above, the device is considered to be identical to the initial estimate. Otherwise, one or more flags can be set to alert a system administrator of this discrepancy. This assists a system administrator in identifying hostile computing devices on the network.

Figure 5:
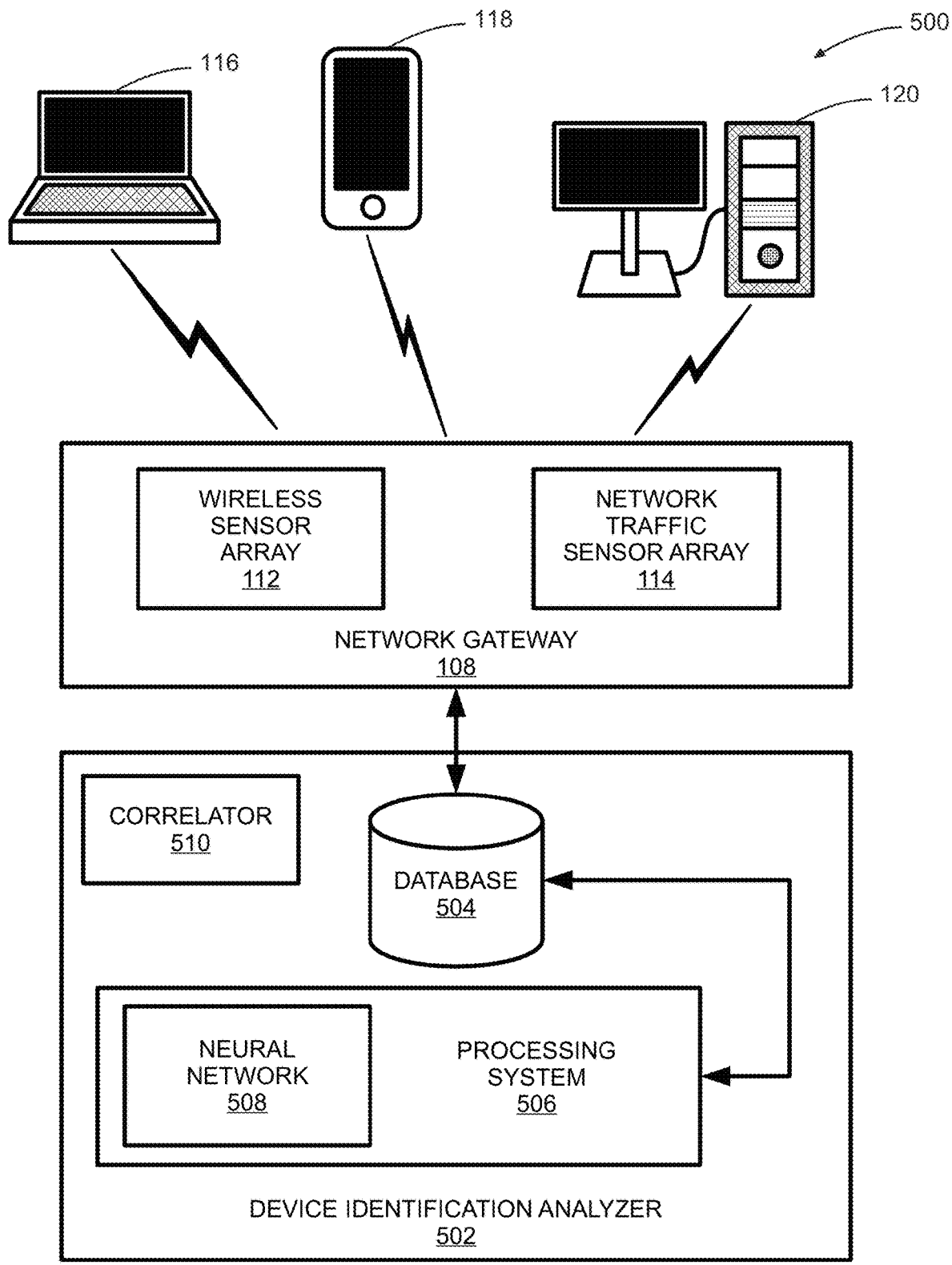
FIG. 5 is a block diagram depicting an embodiment of a computing device classification system.

FIG. 5 is a block diagram depicting an embodiment of a computing device classification system 500. As depicted, computing device classification system 100 includes network gateway 108, a device identification analyzer 502, and computing devices 116 through 120. Network gateway 108 further includes wireless sensor array 112 and network traffic sensor array 114. Device identification analyzer 502 further includes a database 504, a processing system 506, and a correlator 510. Processing system 502 further includes a neural network 508. Computing devices 116 through 120 may be associated with a computer network or a communication network such as an intranet in an office environment.

In one aspect, network gateway 108 is communicatively coupled with device identification analyzer 502. Specifically, network gateway 108 is communicatively coupled with database 504. Database 504 is communicatively coupled with processing system 506. In some embodiments, neural network 508 is a convolutional neural network. In some embodiments, neural network 508 is a recurrent neural network, a temporal convolutional network or a similar learning algorithm. Correlator 510 may be a standalone component of device identification analyzer 502, or correlator 510 may be included in neural network 508 and/or processing system 506.

In one aspect, communication data associated with computing device 116 through computing device 120 is collectively received by network gateway 108 and transmitted to database 504. Database 504 is configured to store communication data (i.e., network communication data) associated with computing device 116 through computing device 120.

In some embodiments, processing system 506 accesses communication data associated with a computing device (e.g., computing device 116) from database 504, and processes the communication data to generate a first data set containing first temporal data and first spatial data associated with computing device 116.

In one aspect, processing system 506 accesses communication data associated with a computing device other than computing device 116 (e.g., computing device 118) from database 504, and processes the communication data to generate a second data set containing second temporal data and second spatial data associated with computing device 118.

In an aspect, correlator 510 computes a first geometric distance between the first temporal data and the second temporal data, and a second geometric distance between the first spatial data and the second spatial data. Responsive to computing the first geometric distance and the second geometric distance, correlator 510 may determine that computing device 116 and computing device 118 are associated with a common user. In one aspect, this determination is based on the first geometric distance and the second geometric distance being less than a first threshold value and a second threshold value (e.g., a temporal threshold value and a spatial threshold value), respectively.

In one aspect, each of the first and the second geometric distance is computed as a norm of a difference between two vectors. Each of the two vectors may characterize spatial and temporal properties of the associated computing device. In another aspect, correlator 510 may perform a correlation operation between two vectors to determine an extent to which the two vectors match each other.

Figure 6:
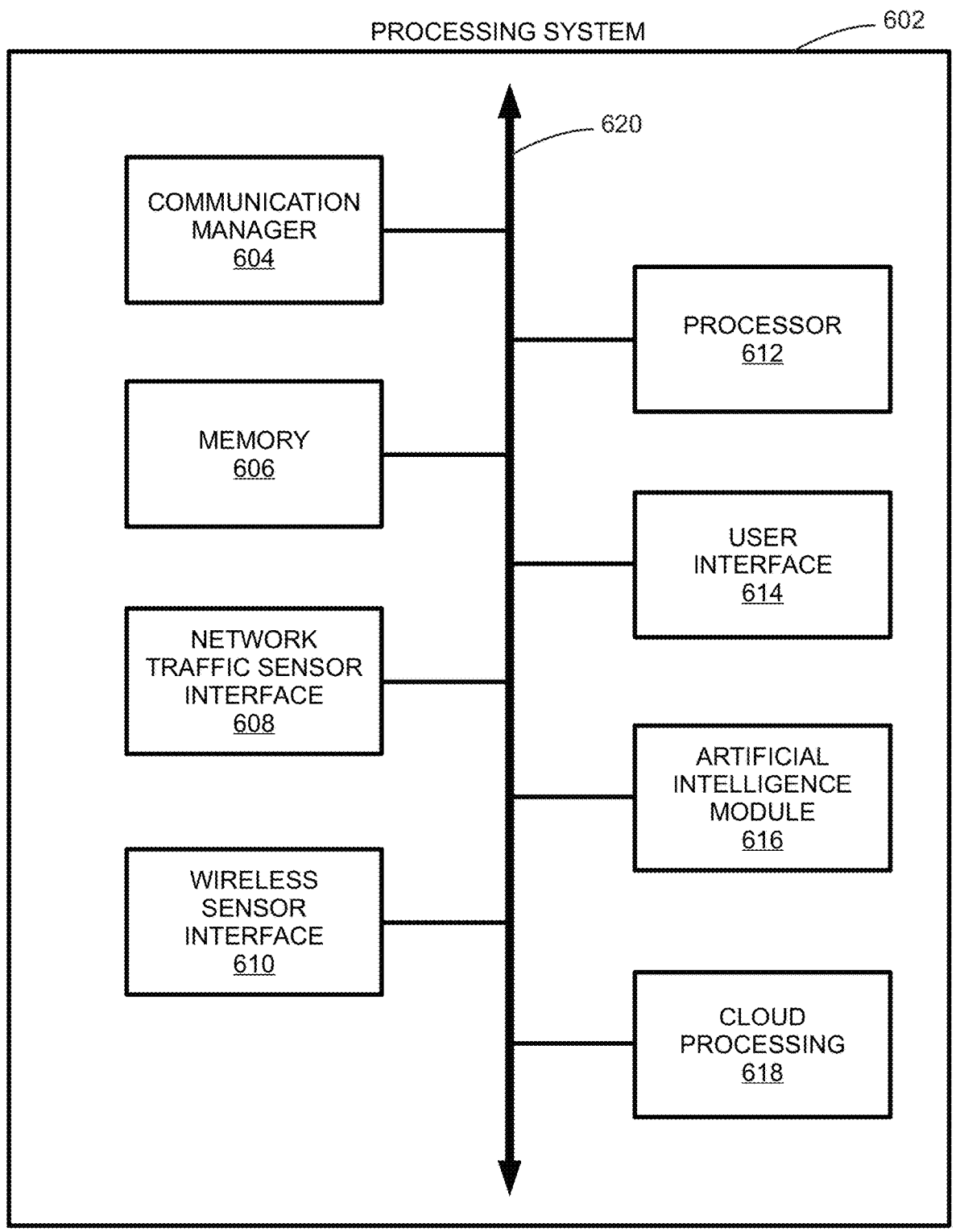
FIG. 6 is a block diagram depicting an embodiment of a processing system.

FIG. 6 is a block diagram depicting an embodiment of a processing system 602. Processing system 602 may be used to enable processing functions associated with the different embodiments presented herein. For example, processing system 602 may perform functions associated with processing system 104 and/or processing system 506.

In some embodiments, processing system 602 includes a communication manager 604 that is configured to manage communication protocols and associated communication with external peripheral devices as well as communication with other components in processing system 602. For example, communication manager 604 may be responsible for generating and maintaining a communication interface between processing system 104 and network gateway 108.

Some embodiments of processing system 602 include a memory 606 that is configured to store data associated with the different computing device classification applications described herein. In particular embodiments, memory 606 includes both long-term memory and short-term memory.

Memory 606 may be comprised of any combination of hard disk drives, flash memory, random access memory, read-only memory, solid state drives, and other memory components.

In some embodiments, processing system 602 includes a network traffic sensor interface 608 that enables processing system 602 to interface and communicate with network traffic sensor array 114. In some embodiments, processing system 602 includes a wireless sensor interface 610 that allows processing system to interface and communicate with wireless sensor array 112.

A processor 612 included in some embodiments of processing system 602 is configured to perform functions that may include generalized processing functions, arithmetic functions, and so on. Processor 612 is configured to process information associated with the systems and methods described herein.

In some embodiments, processing system 602 includes a user interface 614 that allows a user to interact with embodiments of the systems described herein. User interface 614 may include any combination of user interface devices such as a keyboard, a mouse, a trackball, one or more visual display monitors, touch screens, incandescent lamps, LED lamps, audio speakers, buzzers, microphones, push buttons, toggle switches, and so on.

Some embodiments of processing system 602 include an artificial intelligence module 616 that is configure to perform operations related to artificial intelligence, machine learning, neural network functions, and other artificial intelligence related operations presented herein. Artificial intelligence module 616 may be similar to neural network 106 or 508.

Some embodiments of the systems and methods described herein may include cloud computing, where certain functions associated with computing device fingerprint definition are computed on cloud servers, including detecting and combining together all interfaces (e.g. MAC addresses) belonging to a specific computing device. For example, a laptop can have 3 different MAC addresses, one for a Wi-Fi interface, one for a Bluetooth interface, and one for an Ethernet interface. To accomplish this, some embodiments of processing system 602 include a cloud processing 618.

A data bus 620 communicatively couples the different components of processing system 602, and allows data and communication messages to be exchanged between these different components.

FIG. 7 is a schematic depicting a device versus time proximity matrix 700. As depicted, device versus time proximity matrix 700 includes multiple computing devices—a computer A, a phone B, a phone C, a computer D, and a watch E. These computing devices may be similar to computing devices 116 through 120, and may communicate over a communication network or computer network. A temporal history of each computing device is presented as time proximity data in device versus time proximity matrix 700. For each computing device, the corresponding row in time proximity matrix 700 represents the temporal data set for that computing device. Specifically, each of the numbers 1 through 19 represents a time interval (e.g., a day) during which device identification analyzer 110 detects and processes computing device communication data from database 102. In other embodiments, the numbered columns in device versus time proximity matrix 700 may be associated with different time frames rather than days as depicted in FIG. 7. For example, each number might represent a specific hour or range of hours, or a range of minutes in a workday.

In one aspect, the temporal data in device versus time proximity matrix 700 as shown in columns 1 through 19 represents whether a specific device has been detected by, for example, device identification analyzer 110 on that particular day. For example, computer A may be detected to be present on days 1, 2, 4, 6, 8, 14, 16, 17, 18, and 19. For this computing device, the following temporal data vector may be generated based on this temporal data:

$$t_A = \begin{bmatrix} 1 \\ 1 \\ 0 \\ 1 \\ 0 \\ 1 \\ 0 \\ 1 \\ 0 \\ 0 \\ 0 \\ 0 \\ 0 \\ 1 \\ 0 \\ 1 \\ 1 \\ 1 \\ 1 \end{bmatrix}$$

In the above vector, a 1 denotes that the computing device has been detected by device identification analyzer 110 (i.e., is present on the computer/communication network) on that particular day. If the computing device is not detected on the computer/communication network, then the vector entry is a 0. Similarly, the following temporal data vectors may be defined for phone B, phone C, computer D, and watch E, respectively:

$$t_B = \begin{bmatrix} 1 \\ 1 \\ 1 \\ 1 \\ 0 \\ 1 \\ 0 \\ 1 \\ 0 \\ 1 \\ 0 \\ 0 \\ 0 \\ 0 \\ 0 \\ 1 \\ 1 \\ 1 \\ 1 \end{bmatrix} \quad t_C = \begin{bmatrix} 1 \\ 1 \\ 0 \\ 1 \\ 1 \\ 1 \\ 1 \\ 1 \\ 0 \\ 1 \\ 0 \\ 1 \\ 1 \\ 0 \\ 1 \\ 1 \\ 0 \\ 1 \\ 0 \end{bmatrix} \quad t_D = \begin{bmatrix} 1 \\ 1 \\ 1 \\ 1 \\ 1 \\ 1 \\ 1 \\ 0 \\ 0 \\ 1 \\ 1 \\ 1 \\ 1 \\ 0 \\ 1 \\ 1 \\ 1 \\ 1 \\ 1 \end{bmatrix} \quad t_E = \begin{bmatrix} 1 \\ 1 \\ 0 \\ 1 \\ 1 \\ 1 \\ 1 \\ 0 \\ 1 \\ 1 \\ 0 \\ 1 \\ 1 \\ 0 \\ 1 \\ 1 \\ 0 \\ 1 \\ 0 \end{bmatrix}$$

As shown in FIG. 7, hatched area 702 depicts that computer A and phone B belong to a common first user, while hatched areas 704 and 706 depict that phone C and watch E belong to a common second user different from the first user.

As part of processing the vectors to $t_A$ through $t_E$, one approach is to compute a geometric distance for each pair of vectors. This geometric distance may be defined as a norm of the difference between the pair of vectors:

$$d_{ij} = \|t_i - t_j\|,$$

where i and j represent any pairwise combinations of vectors from the vectors to through $t_E$.

Each distance $d_{ij}$ is compared with a temporal threshold value. If the value of the distance is less than the temporal threshold value, it indicates a greater match between the two vectors, and indicates a greater probability that the computing devices belong to a common user.

The term "distance" may refer to any combination of Euclidean, Hamming, Manhattan, Minkowski, Mahalanobis, Cosine, or Jaccard distance measures, or any other distance measure(s) based on vector similarity/distance calculation.

Since a computed distance could be substantially infinitely large, a normalized distance may be calculated by $$\frac{d_{ij}}{f}$$

where f is a normalization factor.

Another way to normalize distances is using one or more sigmoid, hyperbolic or logistic functions to map distance values to finite values between 0 and dmax. For example, dmax=1, or dmax=100.

A zero distance indicates that the two vectors are equal, and this represents the greatest probability that two computing devices belong to a common user. For example, if a user at an office brings in their mobile phone every day and sits at their workstation computer to work, then the temporal vectors corresponding to the mobile phone and the workstation computer will match exactly. On some days, the user may forget their phone to work. This causes a mismatch in the temporal vectors of the two computing devices, as the temporal vector for the mobile phone will have a 0 entry for that day, while the temporal vector for the workstation will have a 1 for the entry for that day. Overall, if the user brings in their mobile phone to work on a regular basis, there will be a general match between the two temporal vectors, especially if sampled over an extended period of time. It is also possible for a temporal vector match to occur between computing devices not belonging to the same user. For example, another user may bring their mobile phone to work daily and work at a separate workstation. In this case, the temporal vectors for both mobile phones and workstation computers will be closely aligned. Using spatial data and data associated with other computing device properties enables distinguishing between these ambiguities.

In a typical workplace environment, all users may not come to work every day (for example, due to absences associated with personal holidays, vacation, sickness, etc.). In such cases, if sampled over a large enough temporal period, multiple devices that are absent together (i.e., simultaneously) may be detected.

In one aspect, instead of computing a norm of a difference between two vectors, a correlation operation may be performed. To do this, a correlation function is calculated for each pair of vectors. Vector pairs exhibiting stronger positively-correlated correlation functions have a higher probability of belonging to a common user.

FIG. 8 is a schematic depicting a device versus location proximity matrix 800. As depicted, device versus location proximity matrix 800 includes the computing devices computer A, phone B, phone C, computer D, and watch E. A spatial history of each computing device is presented as time proximity data in device versus location proximity matrix 800. For each computing device, the corresponding row in device versus location proximity matrix 800 represents the spatial data set for that computing device. Specifically, each of the numbers 1 through 10 represents a location in, for example, an office space or institution which device identification analyzer 110 detects and processes computing device communication data from database 102. Examples of such locations include a cubicle, an office, a kitchen, a conference room, a library, or any other location in a facility or institute/institution. Other examples of an institution include schools, colleges, hospitals, and so on.

In one aspect, the spatial data in device versus location proximity matrix 800 as shown in columns 1 through 10 represents whether a specific device has been detected by, for example, device identification analyzer 110 at a particular location. In one aspect, the numbers 1 through 10 correspond to the following locations in an office environment:

1: Lobby
2: Kitchen
3: Conference Room 1
4: Conference Room 2
5: Conference Room 3
6: Server room
7: Storage Room
8: Floor 1
9: Floor 2
10: Floor 3

In one aspect, a location of a computing device within a facility is determined by processing system by analyzing network communication data associated with the computing device. A periodic sampling process (e.g., every few minutes, every few hours, etc.) may be implemented to update the location of a computing device and track the movement of the computing device within the facility. This gives further insight into characterizing the activity of a user of that computing device.

As depicted in FIG. 8, computer A is detected to be present at locations 3, 4, and 8 during a specific workday. These locations correspond to Conference Room 1, Conference Room 2, and Floor 1, respectively. In this case, it may be inferred that computer A is a laptop computer, and the user takes this computing device into two conference rooms and/or to Floor 1. For this computing device, the following spatial data vector may be generated based on this temporal data:

$$l_A = \begin{bmatrix} 0 \\ 0 \\ 1 \\ 1 \\ 0 \\ 0 \\ 0 \\ 1 \\ 0 \\ 0 \end{bmatrix}$$

In the above vector, a 1 denotes that the computing device has been detected by device identification analyzer 110 (i.e., is present on the computer/communication network) on at a particular location. If the computing device is not detected on the computer/communication network at a location, then the vector entry is a 0. Similarly, the following temporal data vectors may be defined for phone B, phone C, computer D, and watch E, respectively:

$$l_B = \begin{bmatrix} 1 \\ 1 \\ 1 \\ 1 \\ 0 \\ 0 \\ 1 \\ 1 \\ 1 \\ 1 \end{bmatrix} \quad l_C = \begin{bmatrix} 1 \\ 1 \\ 1 \\ 1 \\ 0 \\ 1 \\ 1 \\ 0 \\ 0 \\ 1 \end{bmatrix} \quad l_D = \begin{bmatrix} 0 \\ 0 \\ 0 \\ 0 \\ 1 \\ 0 \\ 0 \\ 0 \\ 0 \\ 0 \end{bmatrix} \quad l_E = \begin{bmatrix} 1 \\ 1 \\ 0 \\ 1 \\ 0 \\ 1 \\ 1 \\ 0 \\ 0 \\ 1 \end{bmatrix}$$

As shown in FIG. 8, hatched areas 802 and 804 depict that phone C and watch E belong to a common user. This association parallels the one determined from processing the spatial data for phone C and watch E.

Using an approach similar to processing the temporal data, the vectors $l_A$ through $l_E$, can be processed by computing a geometric distance for each pair of vectors. This geometric distance may be defined as a norm of the difference between the pair of vectors:

$$D_{ij} = \|l_i - l_j\|,$$

where i and j represent any pairwise combinations of vectors from the vectors $l_A$ through $l_E$.

Each distance $D_{ij}$ is compared with a location threshold value. If the value of the distance is less than the location threshold value, it indicates a greater match between the two vectors, and indicates a greater probability that the computing devices belong to a common user.

A zero distance indicates that the two vectors are equal, and this represents the greatest probability that two computing devices belong to a common user. For example, if a user at an office brings in their mobile phone every day and sits at their workstation computer to work for most of the day while occasionally moving around the office (for example, to attend meetings), then the spatial data for the workstation computer and the mobile phone may generally match. If the user also has a smartwatch and takes both the mobile phone and the smartwatch with them around the office, then there will be a stronger match in the spatial data associated with the smartwatch and the mobile phone.

In one aspect, instead of computing a norm of a difference between two vectors, a correlation operation may be performed. To do this, a correlation function is calculated for each pair of vectors. Vector pairs exhibiting stronger positively-correlated correlation functions have a higher probability of belonging to a common user.

In combination, temporal and spatial data associated with a computing device can be used to characterize ownership of that computing device. Combining temporal and spatial data analysis in this way can reduce any ambiguities that can occur if only temporal or spatial data is used. For example, if a first user and a second user bring in a mobile device to work every day, then the temporal data vectors for those two mobile devices will be strongly matched, even though these mobile devices belong to different users. In this case, using spatial data that shows the two mobile devices at different spatial locations in the institution will help resolve this ambiguity.

Figure 9:
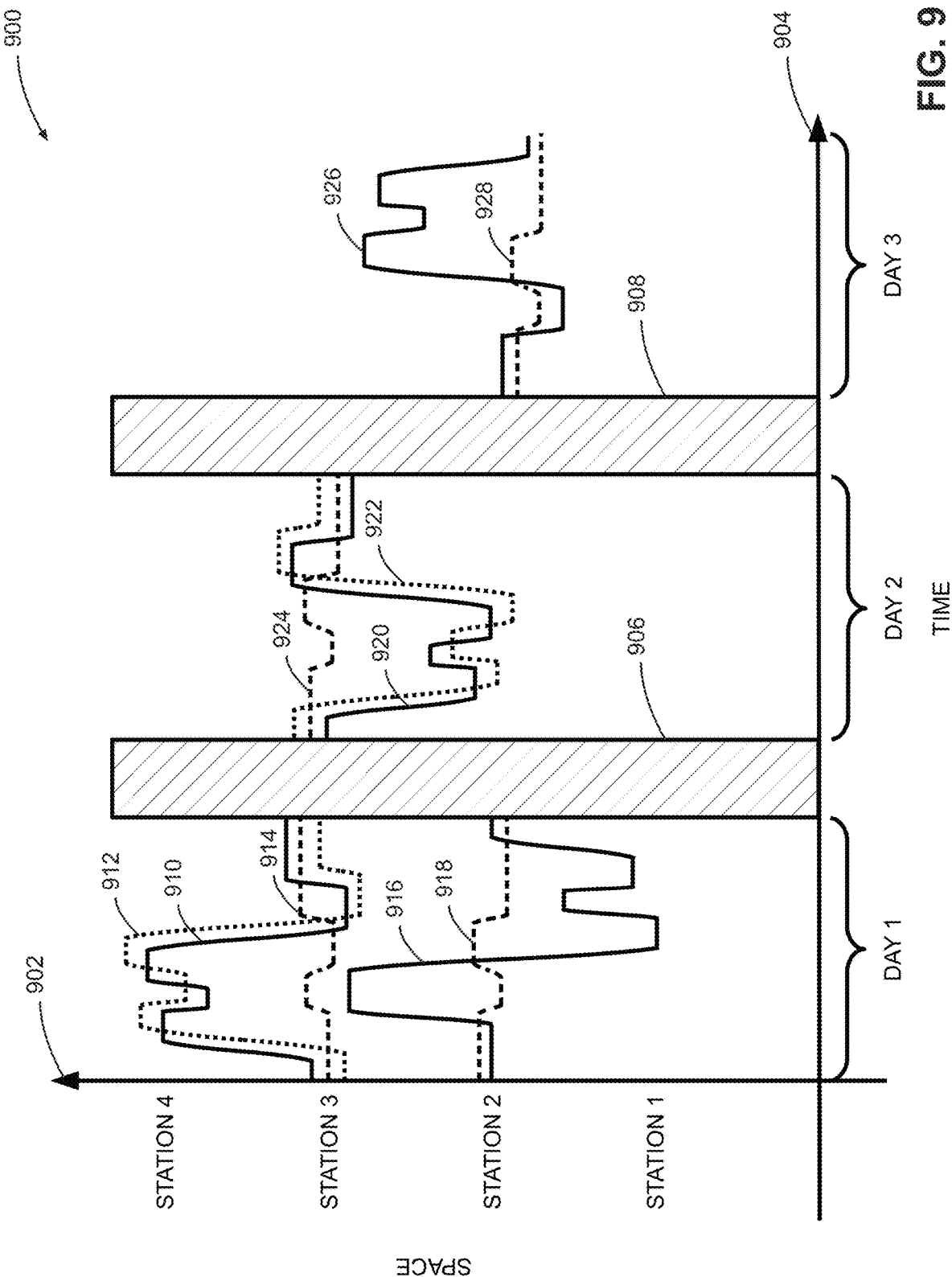
FIG. 9 is a schematic depicting a time-space characterization of one or more computing devices associated with a computer network.

FIG. 9 is a schematic depicting a time-space characterization 900 of one or more computing devices associated with a computer network. Time-space characterization 900 may be viewed as a visual representation derived from combining temporal data and spatial data for one or more computing devices. In one aspect, time-space characterization 900 plots a location of each computing device at an institution versus time.

As depicted, time-space characterization 900 includes a temporal axis 904 and a spatial axis 902. Temporal axis 904 is divided into different day and night zones—a day 1, a night 906, a day 2, a night 908, a day 3, and so on. These day and night zones may be related to time intervals 1 through 18 in FIG. 7. Spatial axis 902 shows different locations at an institution—a station 1, a station 2, a station 3, a station 4, and so on. Each of station 1 through station 4 may be a location from 1 through 10 in FIG. 8.

Time-space characterization 900 includes a path 910 of a first computing device on day 1. This computing device is first detected at station 3, and then moves to station 4. The first computing device remains around station 4 for some time, and then returns to station 3.

Time-space characterization 900 includes a path 912 of a second computing device on day 1. This computing device is first detected at station 3, and then moves to station 4. The second computing device remains around station 4 for some time, and then returns to station 3.

Time-space characterization 900 includes a path 914 of a third computing device on day 1. This computing device remains around station 3 for the whole day.

Time-space characterization 900 includes a path 916 of a fourth computing device on day 1. This computing device is first detected at station 2, and then moves to station 1. The fourth computing device remains around station 1 for some time, and then returns to station 2.

Time-space characterization 900 includes a path 918 of a fifth computing device on day 1. This computing device remains around station 2 for the whole day.

Time-space characterization 900 includes a path 920 of the first computing device on day 2. This computing device is first detected at station 3, and then moves to station 2. The first computing device remains around station 2 for some time, and then returns to station 3.

Time-space characterization 900 includes a path 922 of the second computing device on day 2. This computing device is first detected at station 3, and then moves to station 2. The second computing device remains around station 2 for some time, and then returns to station 3.

Time-space characterization 900 includes a path 924 of the third computing device on day 2. This computing device remains around station 3 for the whole day.

Time-space characterization 900 includes a path 926 of the fourth computing device on day 3. This computing device is first detected at station 2, and then moves to station 3. The fourth computing device remains around station 3 for some time, and then returns to station 2.

Time-space characterization 900 includes a path 938 of the fifth computing device on day 3. This computing device remains around station 2 for the whole day.

No computing device activity is detected during either night 906 or night 908; detecting any activity associated with any of the first through the fifth computing device may suggest abnormal activity or anomalous behavior. This, in turn, may be used to trigger one or more security alerts.

Based on time-space characterization 900, the following can be inferred:

The first, second and third computing devices can be associated with a first user. Of these computing devices, the third computing device is most likely a computer that remains at station 3. The first and second computing devices are portable computing devices (e.g., any combination of a laptop, a tablet, a smartwatch, or a mobile phone). The first user carries these devices when they go to station 4 (on day 1) and station 2 (on day 2).

The first user is most likely not in the institution on day 3.

The fourth and the fifth computing devices can be associated with a second user. Of these computing devices, the fifth computing device is most likely a computer that remains at station 2. fourth computing device is a portable computing devices (e.g., any of a laptop, a tablet, a smartwatch, or a mobile phone). The second user carries these devices when they go to station 1 (on day 1) and station 3 (on day 3).

The second user is most likely not in the institution on day 2.

FIG. 10 is a schematic depicting a device versus properties similarity matrix 1000. Device versus properties similarity matrix 1000 presents data other than temporal data and spatial data that may be extracted from network communication data associated with one or more computing devices. This data may be used to enhance the accuracy of associating a computing device to a user.

As depicted, device versus properties similarity matrix 1000 includes the computing devices computer A, phone B, phone C, computer D, and watch E. The columns of device versus property similarity matrix 1000 include a hostname and a username. In one aspect, a hostname is a name given to a computing device, while a username may be associated with a login credential.

As depicted in device versus properties similarity matrix 1000:

Computer A has a hostname "JohnsMBA" and a username "John.smith."

Phone B has a hostname "JohnsiPhone."

Phone C has a hostname "Jills iPhone 6s."

Computer D has a hostname "Desktop1234" and a username "Jill.smith."

Watch E has a hostname "Jillswatch."

From the above information, it can be inferred that computer A and phone B can be associated with a user John Smith, while phone C, computer D and watch E can be associated with a user Jill Smith. This is depicted by hatched areas 1002 and 1004, respectively.

Data from device versus property similarity matrix 1000 can be used to refine results presented in device versus time proximity matrix 700, device versus location proximity matrix 800, and time-space characterization 900.

In general, for associating one or more computing devices to a single user at an institution, the following positively-correlated indicators (suggesting a common user) can be used:

Username

Hostname

Absent days pattern (time proximity)

The following are negatively-correlated indicators (suggesting different users):

Simultaneous activity at different locations

Same device types (it is unlikely that a single user would possess two of the same computing device at the same time)

While associating one or more computing devices to a common user, the following properties may be used:

Hyper context

Times that devices arriving at and leaving the institution

Physical proximity, same access point,

Computing devices seen by same sensors

Common location

Based on established user-computing device associations, computing device classification system 100 can provide feedback, per department and organization unit in the institution, to an IT department. Additional information that can be determined is the types of computing devices brought in to the institution, and how compliant and/or how risky these computing devices are with respect to established institution security and work policies. Computing device classification system 100 can also associate which computing devices are talking to which other computing devices at the institution. Data generated by computing device classification system 100 can also be used for ensuring computing device compliance within the institution and providing department-based codes, such as informing a department head whether the users in the department are misbehaving or whether any computing devices are non-compliant with security and other standards.

Computing device classification system 100 may also be configured to process computing device network communication data that includes Wi-Fi authentication, host names, patterns of movement, authentication, etc. This data can be further used to augment decision making when associating multiple computing devices to a common user.

Figure 11:
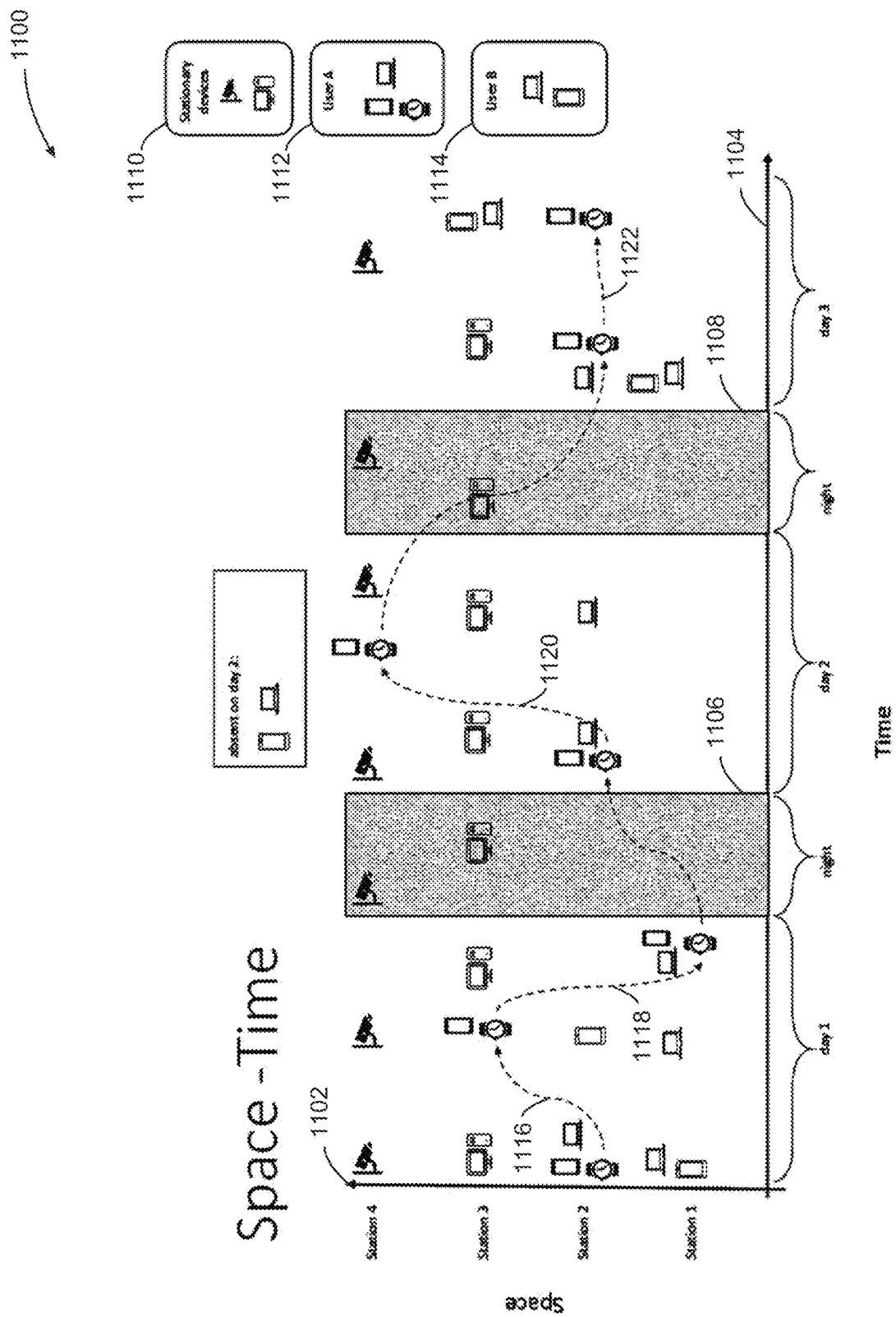
FIG. 11 is a schematic depicting a time-space characterization of one or more computing devices associated with a computer network.

FIG. 11 is a schematic depicting a time-space characterization 1100 of one or more computing devices associated with a computer network. Time-space characterization 1100 may be viewed as a visual representation derived from combining temporal data and spatial data for one or more computing devices. In one aspect, time-space characterization 1100 plots a location of each computing device at an institution versus time.

As depicted, time-space characterization 1100 includes a temporal axis 1104 and a spatial axis 1102. Temporal axis 1104 is divided into different day and night zones –a day 1, a night 1106, a day 2, a night 1108, a day 3, and so on. Spatial axis 902 shows different locations at an institution—a station 1, a station 2, a station 3, a station 4, and so on. Each of station 1 through station 4 may be a location from 1 through 10 in FIG. 8.

Time-space characterization 1100 depicts three groups of computing devices:

Stationary computing devices (group 1108): a surveillance camera located at station 4, and a desktop computer located at station 3.

Computing devices belonging to a user A (group 1110): a smartwatch, a mobile phone, and a laptop computer.

Computing devices belonging to a user B (group 1112): a mobile phone and a laptop computer.

As depicted in time-space characterization 1100, the stationary computing devices are present and visible at their respective stations every day and every night. These computing devices may belong to the institution.

On day 1, the computing devices belonging to user A are initially seen to be visible at station 2. On day 1, the computing devices belonging to user B are initially seen to be visible at station 1. Time-space characterization 1100 depicts multiple computing devices transitioning to and from the different stations as users A and B move around the institution.

On day 1, user A goes from station 2 to station 3, taking with them their smartwatch and mobile phone. For example, a transition 1116 depicts the smartwatch belonging to user A transitioning from station 2 to station 3. As user A transitions from station 2 to station 3, the mobile phone belonging to user B is seen at station 2. The laptop computer belonging to user B is still at station 1. At the same time, the laptop belonging to user A is not seen at station 2; it may be inferred that user A has shut down that laptop. Later in the day on day 1, all three computing devices belonging to user A are seen at station 1. No computing devices belonging to user B are seen on the computer network. It may be assumed that user B has left for the day, while user A has transitioned from station 3 to station 1. For example, a transition 1118 depicts the smartwatch belonging to user A transitioning from station 3 to station 1.

On day 2, the computing devices belonging to user A are initially seen to be visible at station 2. None of user B's computing devices are visible on the computer network. Based on this, it may be inferred that user B is absent on day 2. User 1 is seen to transition from station 1 to station 4, taking with them their smartwatch and mobile phone. For example, a transition 1120 depicts the smartwatch belonging to user A transitioning from station 2 to station 4. During this time, the laptop computer belonging to user A remains at station 2.

On day 3, the computing devices belonging to user A are initially seen to be visible at station 2. On day 3, the computing devices belonging to user B are initially seen to be visible at station 1. On this day, user A stays at station 2 all day. For example, a path 1122 depicts no transition of the smartwatch belonging to user A. In other words, the smartwatch belonging to user A remains at station 2 all day. The laptop computer belonging to user A is not seen on the network towards the end of day 3, suggesting that user A shuts down their laptop towards the end of the day. The laptop computer and mobile phone belonging to user B are seen to transition from station 1 to station 3 on day 3, and remain there till the end of day 3.

During nights 1106 and 1108, only the stationary computing devices are visible on the computer network.

Although the present disclosure is described in terms of certain example embodiments, other embodiments will be apparent to those of ordinary skill in the art, given the benefit of this disclosure, including embodiments that do not provide all of the benefits and features set forth herein, which are also within the scope of this disclosure. It is to be understood that other embodiments may be utilized, without departing from the scope of the present disclosure.

What is claimed is:

1. A method comprising:
   receiving first network communication data for a first computing device over a communication network;
   receiving second network communication data for a second computing device over the communication network;
   extracting a first data set from the first network communication data, the first data set including first spatial data and first temporal data associated with the first computing device;
   extracting a second data set from the second network communication data, the second data set including second spatial data and second temporal data associated with the second computing device;
   correlating the first data set and the second data set, the correlating including:
      computing a first geometric distance between the first temporal data and the second temporal data; and
      computing a second geometric distance between the first spatial data and the second spatial data; and
   identifying that the first computing device and the second computing device belong to a common user, the identifying being responsive to the first geometric distance being less than a first threshold value associated with a measure of time, and the second geometric distance being less than a second threshold value associated with a measure of physical location.

2. The method of claim 1, wherein the first data set further includes any combination of a first user name, a first hostname, and a first Wi-Fi probe history, and the second data set includes any combination of a second user name, a second hostname, and a second Wi-Fi probe history.

3. The method of claim 1, wherein the first network communication data and the second network communication data are any combination of Wi-Fi data, Ethernet data, Bluetooth data, LTE data, mobile data, Lorawan data, ZigBee data, ultrasound communication data, or optical communication data.

4. The method of claim 1, wherein the first network communication data and the second network communication data are associated with an intranet.

5. The method of claim 1, wherein the first computing device and the second computing device are any combination of a desktop computer, a laptop computer, a tablet, a cellular phone, and an internet-of-things (IoT) device.

6. The method of claim 1, wherein each of the first spatial data set, the second spatial data set, the first temporal data set, and the second temporal data set is rendered as a distinct vector.

7. The method of claim 1, further comprising tracking a motion of the first computing device or the second computing device using a combination of the first temporal data set and the first spatial data set, or the second temporal data set and the second spatial data set, respectively.

8. The method of claim 7, further comprising determining a location of the user in an institution associated with the communication network.

9. The method of claim 8, further comprising tracking a movement of the user within the institution.

10. The method of claim 8, further comprising flagging any suspicious activity by the user within the institution.

11. An apparatus comprising:
a database configured to store first network communication data for a first computing device and second network communication data for a second computing device, the first network communication data and the second network communication data being received over a communication network;
a processing system configured to:
extract a first data set from the first network communication data, the first data set including first spatial data and first temporal data associated with the first computing device; and
extract a second data set from the second network communication data, the second data set including second spatial data and second temporal data associated with the second computing device; and
a correlator configured to:
correlate the first data set and the second data set, the correlating including:
compute a first geometric distance between the first temporal data and the second temporal data;
compute a second geometric distance between the first spatial data and the second spatial data; and
identify that the first computing device and the second computing device belong to a common user, the identifying being responsive to the first geometric distance being less than a first threshold value associated with time, and the second geometric distance being less than a second threshold value associated with physical location.

12. The apparatus of claim 11, wherein the first data set further includes any combination of a first user name, a first hostname, and a first Wi-Fi probe history, and the second data set includes any combination of a second user name, a second hostname, and a second Wi-Fi probe history.

13. The apparatus of claim 11, wherein the first network communication data and the second network communication data are any combination of Wi Fi data, Ethernet data, Bluetooth data, LTE data, mobile data, Lorawan data, ZigBee data, ultrasound communication data, or optical communication data.

14. The apparatus of claim 11, wherein the first network communication data and the second network communication data are associated with an intranet.

15. The apparatus of claim 11, wherein the first computing device and the second computing device are any combination of a desktop computer, a laptop computer, a tablet, a cellular phone, and an internet-of-things (IoT) device.

16. The apparatus of claim 11, wherein each of the first spatial data set, the second spatial data set, the first temporal data set, and the second temporal data set is rendered as a distinct vector.

17. The apparatus of claim 11, wherein the processing system is configured to track a motion of the first computing device or the second computing device using a combination of the first temporal data set and the first spatial data set, or the second temporal data set and the second spatial data set, respectively.

18. The apparatus of claim 17, further comprising determining a location of the user in an institution associated with the communication network.

19. The apparatus of claim 18, further comprising tracking a movement of the user within the institution.

20. The apparatus of claim 18, further comprising flagging any suspicious activity by the user within the institution.

* * * * *